United States Patent
Krawinkel

(10) Patent No.: US 11,835,642 B2
(45) Date of Patent: Dec. 5, 2023

(54) FLYING APPARATUS FOR CALIBRATING A RADAR SYSTEM

(71) Applicant: Rohde & Schwarz GmbH & Co. KG, Munich (DE)

(72) Inventor: Christian Krawinkel, Markt Schwaben (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 344 days.

(21) Appl. No.: 16/906,039

(22) Filed: Jun. 19, 2020

(65) Prior Publication Data

US 2021/0396841 A1 Dec. 23, 2021

(51) Int. Cl.
| | |
|---|---|
| *G01S 7/40* | (2006.01) |
| *B64C 39/02* | (2023.01) |
| *H01Q 15/14* | (2006.01) |
| *B64D 47/00* | (2006.01) |
| *B64U 10/13* | (2023.01) |
| *B64U 101/00* | (2023.01) |

(52) U.S. Cl.
CPC ............. *G01S 7/40* (2013.01); *B64C 39/024* (2013.01); *B64D 47/00* (2013.01); *H01Q 15/14* (2013.01); *B64U 10/13* (2023.01); *B64U 2101/00* (2023.01)

(58) Field of Classification Search
CPC .... H04B 17/318; H04B 7/043; H04B 17/391; H04B 7/0617; H04B 7/086; H04B 7/0897; H04B 7/026; H04B 17/104; H04W 4/46; H04W 4/40; G01S 7/40; B64C 39/024; H01Q 15/14; B64U 10/13; B64U 2101/00
See application file for complete search history.

(56) References Cited

U.S. PATENT DOCUMENTS

| | | | | |
|---|---|---|---|---|
| 4,723,123 A | * | 2/1988 | Marlow | G01S 13/756 342/6 |
| 5,150,122 A | * | 9/1992 | Bell | H01Q 15/18 342/13 |
| 6,234,634 B1 | * | 5/2001 | Hansen | G02B 5/3058 353/20 |
| 10,705,187 B1 | * | 7/2020 | Hebert | F41J 2/00 |
| 2008/0007707 A1 | * | 1/2008 | Kim | G01C 3/08 359/211.2 |
| 2016/0018451 A1 | * | 1/2016 | Heumphreus | G01R 29/0814 324/628 |
| 2017/0127241 A1 | * | 5/2017 | Sjölund | H04W 4/33 |
| 2018/0115276 A1 | * | 4/2018 | Wildman | H01L 31/0547 |
| 2020/0203847 A1 | * | 6/2020 | Gheorghian | H01Q 1/288 |
| 2020/0363539 A1 | * | 11/2020 | Cao | G01T 1/241 |
| 2020/0400779 A1 | * | 12/2020 | Qiu | G01S 7/038 |

FOREIGN PATENT DOCUMENTS

| | | |
|---|---|---|
| EP | 3580580 A2 | 12/2019 |
| RU | 2628671 C1 | 8/2017 |
| WO | 2018146430 A2 | 8/2018 |

* cited by examiner

*Primary Examiner* — Fred A Casca
(74) *Attorney, Agent, or Firm* — DITTHAVONG, STEINER & MLOTKOWSKI

(57) ABSTRACT

The invention relates to a flying apparatus for calibrating a radar system including: a base body, wherein the base body includes: at least one rotor adapted to generate lift, a drive configured to drive the rotor, and a control unit configured to control a flying operation of the flying apparatus; and a radar reflective structure, wherein at least one part of the radar reflective structure is movably mounted to the base body, and wherein the at least one part can be moved actively or passively.

14 Claims, 4 Drawing Sheets

FLYING APPARATUS FOR CALIBRATING A RADAR SYSTEM

TECHNICAL FIELD OF THE INVENTION

The invention relates to the technical field of radar systems. In particular, the invention relates to a flying apparatus for calibrating a radar system and to the use of such a flying apparatus for calibrating a radar system. The invention further relates to a method for calibrating a radar system.

BACKGROUND OF THE INVENTION

A radar system uses radio waves to detect an object in a detection range of the system. Such a radar system, generally, comprises a transmitter, which transmits an electromagnetic wave in the direction of the object, a receiver, which receives a reflection of said wave from the object, and a processor, which, then, determines a property of the object, for example a range, an angle or a velocity.

After installation of a radar system, it is usually necessary to accurately calibrate the system to achieve a high measurement precision. The calibration can comprise detecting, by means of the radar system, various parameters of a test object in the detection range of the system. For example, the detected parameters can comprise a range, an azimuth or an elevation of the test object.

The document RU 2 628 671 C1 discloses the use of an unmanned aerial vehicle as a test object for calibrating a radar system. The vehicle is surrounded by a spherical radiation reflector, which is made of wire or tubes arranged as a grid. However, due to this grid arrangement, the reflector only reflects radiation in a certain frequency range, which depends on the grid width. Further, the spherical arrangement of the reflector can lead to unwanted RF shielding of the aerial vehicle, which makes it difficult to communicate with the vehicle, for instance, for remote controlling of the vehicle.

The document EP 3 580 580 A1 discloses a flying drone as a calibration device for radar measurements. The drone comprises a radar wave reflector with an annular shape, that is fixed to the drone by a fixing means, and that laterally surrounds rotors of the drone. Thereby, the drone and the fixing means are at least partially masked by the reflector, for a radar wave, which reaches the calibration device in a direction of incidence oblique or perpendicular to the axis of symmetry of the reflector. However, it is difficult to distinguish such a drone from a background environment during calibration, especially if the drone is currently not moving. In addition, it is not possible to calibrate velocities if the drone is not moving.

Thus, it is an objective to provide an improved flying apparatus and an improved method for calibrating a radar system, which avoid the above-mentioned disadvantages.

SUMMARY OF THE INVENTION

The object of the present invention is achieved by the solution provided in the enclosed independent claims. Advantageous implementations of the present invention are further defined in the dependent claims.

According to a first aspect, the invention relates to a flying apparatus for calibrating a radar system, comprising:
a base body, wherein the base body comprises:
 at least one rotor adapted to generate lift,
 a drive configured to drive the rotor, and
 a control unit configured to control a flying operation of the flying apparatus; and
a radar reflective structure, wherein at least one part of the radar reflective structure is movably mounted to the base body, and wherein the at least one part can be moved actively or passively.

This achieves the advantage that a flying test object is provided that allows for an efficient calibration of a radar system. In particular, due to the fact that the radar reflective structure is at least partially movably mounted to the base body, the flying apparatus can more easily be detected by the radar system. For example, a radar beam that is reflected from the reflective structure can be modified or superimposed with a characteristic, e.g. a Doppler shift, due to the movement of the at least one part of the structure. This characteristic can make it easier to distinguish the flying apparatus from a static environment or from other targets.

In addition, the movement of at least one part of the radar reflective structure relative to the base body allows a calibration of radar detected velocities even if the flying apparatus floats in a fixed position in space. In particular, by moving the reflective structure, a Doppler shift of the reflected signal can be generated which simulates a movement of the flying apparatus with a certain velocity. This simplifies the calibration of the radar system.

The flying apparatus can be an unmanned aerial vehicle (UAV), in particular a drone. For example, the flying apparatus can be a helicopter-type UAV. Preferably, the flying apparatus is capable to fly forward, backward, and laterally, and to hover in space.

The drive can be an electric motor, a piston engine or a different type of engine. The drive can comprise one engine for each rotor or a single engine configured to drive all rotors of the flying apparatus.

In particular, actively moving the at least one part of the radar reflective structure may refer to directly driving and controlling the movement, e.g. by means of a driving means that can be integrated in the base body and controlled by a controller of the flying apparatus and/or by a user via a remote control. In contrast, passively moving refers to not directly driven movements that, for instance, are caused by drag, airstreams or inertia.

Preferably, either one or more parts of the radar reflective structure are movably mounted to the base body while the remaining parts of the structure, e.g. fixtures, are non-movably mounted, or the whole radar reflective structure is movably mounted to the base body.

The radar system can comprise a transmitter, which transmits a radar signal in the form of an electromagnetic wave in the direction of the flying apparatus, a receiver, which receives a reflection of said wave from the flying apparatus, and a processor, which determines a property of the flying apparatus. The transmitter and the receiver can each be coupled to a respective antenna.

The radar system can be configured to detect a position, a range, an azimuth, an elevation and/or velocity of an object in a detection range of the system. In particular, the radar system is a Doppler radar, that is configured to detect a velocity of objects using the Doppler effect, e.g. by analyzing how the motion of the object has altered the frequency of a returned signal.

In an embodiment, the at least one part of the radar reflective structure is rotably mounted to the base body.

This achieves the advantage that a radar beam, that is reflected from the reflective structure, can efficiently be modified or superimposed with a characteristic, e.g. a Doppler shift or an intensity variation, caused by the rotation.

This can make it easier to distinguish the flying apparatus from a static environment. Furthermore, rotating at least one part of the radar reflective structure is easier than rotating the whole drone with constant rotational speed while hovering at a fixed position in space.

In an embodiment, a rotation axis of the at least one part of the reflective structure is identical to at least one rotor axis, or the rotation axis of the at least one part of the reflective structure passes through the center of gravity of the flying apparatus.

This achieves the advantage that a flight stability of the flying apparatus is not negatively affected by the rotation.

In an embodiment, the base body is at least partially surrounded by the radar reflective structure.

This achieves the advantage that the radar reflective structure forms a sufficiently large target with a defined radar cross section that can be hit by a radar beam from any side.

In an embodiment, the radar reflective structure comprises reflective and non-reflective elements.

This achieves the advantage that a radar beam that is reflected from the reflective structure can efficiently be modified or superimposed with a characteristic, e.g. a Doppler shift.

In an embodiment, the radar reflective structure comprises a cylindrical structure.

This achieves the advantage that the flying apparatus has a known and easy to distinguish radar cross section that looks identical from every side.

In particular, the cylindrical structure is open at the top and the bottom. This avoids that the area above and below the at least one rotor is covered and, thus, prevents that the rotor performance is negatively affected. Further, the fact that the cylindrical structure is open at the top and the bottom avoids that the flying apparatus is electromagnetically shielded by the radar reflective structure, such that a remote control signal or a data uplink/downlink are not negatively affected.

Preferably, a surface, in particular an surface, of the cylindrical structure can be rotated relative to the base body.

In an embodiment, the reflective and non-reflective elements are alternately arranged on an outer surface of the cylindrical structure.

This achieves the advantage that a radar beam that is reflected from the reflective structure can efficiently be modified with a characteristic, e.g. a Doppler shift and/or an intensity variation. In particular, at least the surface of the cylindrical structure with the reflective and non-reflective elements can be rotated.

In an embodiment, the radar reflective structure comprises at least one reflective panel, which is mounted to the base body with an elongated connecting piece.

This achieves the advantage that a Doppler shift in a reflected radar beam can efficiently be generated by moving, in particular rotating, the at least one reflective panel. In particular, the at least one reflective panel is movably, preferably rotably, mounted to the base body.

In an embodiment, the reflective structure comprises a rotor structure, which is preferably different from the at least one rotor configured to generate lift.

This achieves the advantage that a Doppler shift in a reflected radar beam can efficiently be generated by moving, in particular rotating, the at least one reflective panel.

In an embodiment, the reflective structure is configured to reflect an incoming radar signal in at least two different directions.

This achieves the advantage that an absolute position of the flying apparatus in space can efficiently be detected by the radar system. In particular, the incoming radar signal can be a radar beam that is generated by the radar system.

In an embodiment, the flying apparatus comprises a controller, which is configured to control the movement, in particular a rotation, of the at least one part of the radar reflective structure.

This achieves the advantage that a movement of the reflective structure, e.g. a rotational speed, can efficiently be controlled, for instance to set a Doppler shift of a radar signal that is reflected off the radar reflective structure in order to simulate a velocity.

In an embodiment, the flying apparatus comprises a receiving unit configured to receive a control command for controlling the movement of the at least one part of the radar reflective structure.

This achieves the advantage that the movement of the radar reflective structure can be remote-controlled by a user.

In an embodiment, the flying apparatus is a drone, in particular a quadcopter or other multicopter drone.

All the above-mentioned embodiments and/or optional features of the flying apparatus can be combined.

According to a second aspect, the invention relates to a use of the flying apparatus of the first aspect of the invention for calibrating a radar system.

According to a third aspect, the invention relates to a method for calibrating a radar system, wherein the method comprises:

flying a flying apparatus, in particular the flying apparatus according to the first aspect of the invention, through a detection range of the radar system;

reflecting a radar signal from a radar reflective structure of the flying apparatus, wherein at least one part of the radar reflective structure is movably mounted to a base body of the flying apparatus;

detecting the reflected signal with the radar system; and calibrating the radar system based on the detected reflected signal while taking into account the movement of the at least one part of the of the radar reflective structure relative to the base body.

This achieves the advantage that the radar system can efficiently be calibrated with a flying apparatus acting as target. In particular, due to the fact that the radar reflective structure is at least partially movably mounted to the base body, the flying apparatus can more easily be detected by the radar system. For example, a radar beam that is reflected from the reflective structure can be modified or superimposed with a characteristic, e.g. a Doppler shift, due to the movement of the at least one part of the structure. This characteristic can make it easier to distinguish the flying apparatus from a static environment or from other targets.

In addition, the movement of at least one part of the radar reflective structure relative to the base body allows a calibration of radar detected velocities even if the flying apparatus floats in a fixed position in space. In particular, by moving the reflective structure, a Doppler shift of the reflected signal can be generated which simulates a movement of the flying apparatus with a certain velocity. This simplifies the calibration of the radar system.

Preferably, the at least one part of the radar reflective structure can be moved actively or passively.

The above description with regard to the flying apparatus according to the first aspect of the invention is correspondingly valid for the method for calibrating the radar system according to the third aspect of the invention.

BRIEF DESCRIPTION OF THE DRAWINGS

The invention will be explained in the followings together with the figures.

DETAILED DESCRIPTION OF THE PREFERRED EMBODIMENTS

Figure 1:
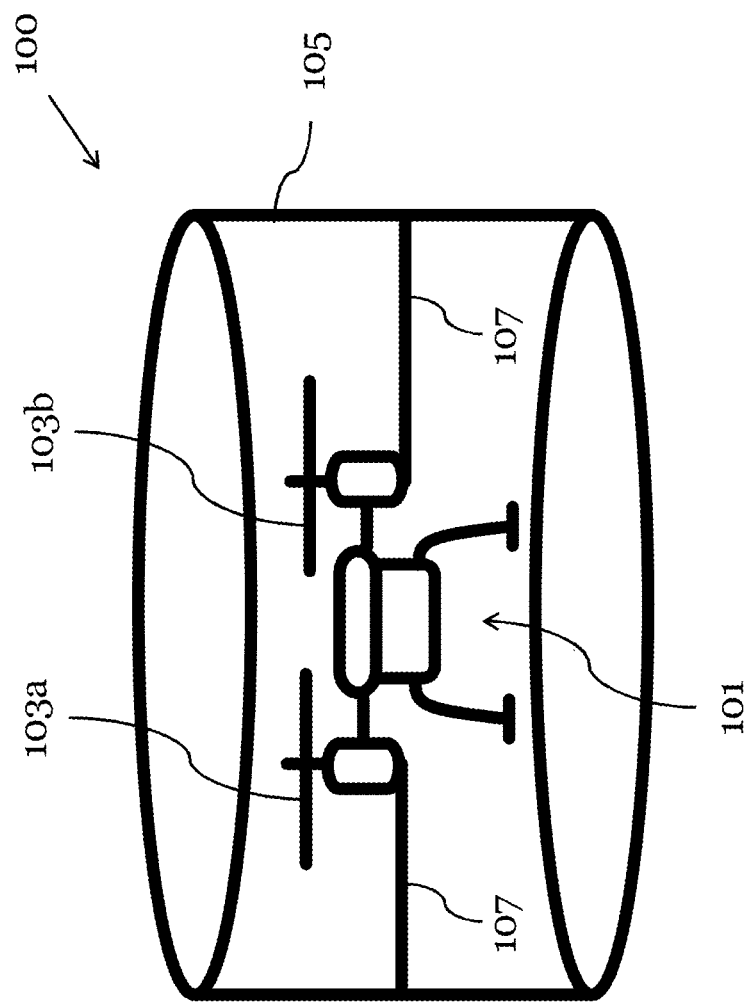
FIG. 1 shows a schematic diagram of a flying apparatus for calibrating a radar system according to an embodiment.

FIG. 1 shows a schematic diagram of a flying apparatus 100 for calibrating a radar system according to an embodiment.

The flying apparatus 100 comprises a base body 101. The base body 101 comprises at least one rotor 103*a-b* adapted to generate lift, a drive configured to drive the at least one rotor 103*a-b*, and a control unit configured to control a flying operation of the flying apparatus 100. The flying apparatus further comprises a radar reflective structure 105, wherein at least one part of the radar reflective 105 structure is movably mounted to the base body 101, and wherein the at least one part of the radar reflective structure 105 can be moved actively or passively, in particular is adapted to be moved actively or passively.

The flying apparatus 100 can be an unmanned aerial vehicle (UAV). The flying apparatus 100 can be a drone, in particular a quadcopter or other multicopter drone. Preferably, the flying apparatus 100 is capable to fly forward, backward, and laterally, and to hover in space.

The drive can be an electric motor, a piston engine or a different type of engine. The drive can comprise one engine for each rotor 103*a-b* or a single engine configured to drive all rotors 103*a-b* of the flying apparatus 100.

The control unit can comprise a processor. The control unit can be configured to control the rotor 103*a-b* based on received and/or pre-defined control commands.

In the exemplary embodiment of FIG. 1, the reflective structure 105 comprises a cylindrical structure that surrounds the base body 101 of the flying apparatus 100.

Preferably, an outer surface of the cylindrical structure forms a massive reflector which has a defined radar cross-section and which is capable of reflecting radar signals with various different frequencies.

Preferably, the cylindrical structure 105 is open at the top and the bottom. This avoids that the area above and below the at least one rotor 103*a-b* is covered and, thus, prevents that the rotor performance is negatively affected by the reflective structure 105. Additionally, the openings of the cylindrical structure 105 prevent an shielding of the apparatus 100 from radio frequency (RF) signals, e.g. remote control signals or data down/uplinks.

Preferably, the at least one part of the radar reflective structure 105 is rotably mounted to the base body 101. The rotation of the at least one part of the structure 105 can modify and/or superimpose a radar signal that is reflected off a rotating surface of the structure 105 with a characteristic, in particular a Doppler sift. This characteristic can make the flying apparatus 100 easier to identify and to detect against a static background or other static targets.

Further, adjusting the rotation speed of the at least one part of the radar reflective structure 105 allows controlling the degree of the Doppler shift in the reflected signal. In this way, the radar system can be calibrated to detect different velocities based on the Doppler effect without needing to fly the flying apparatus 100 at these velocities.

If the radar reflective structure 105 comprises a cylindrical structure, as shown in FIG. 1, at least a part of this cylindrical structure, in particular the outer surface, can be adapted to rotate around a rotation axis that preferably passes through a center of gravity of the flying apparatus. Alternatively, the rotation axis can be identical to a rotation axis of the rotor of the apparatus 100, in particular if the apparatus is a helicopter drone with only one rotor.

In particular, the flying apparatus comprises a controller to control the movement, in particular the rotation, of the at least one part of the reflective structure 105. The controller for controlling the movement of the reflective structure 105 and the control unit for controlling the rotors 103*a-b* can be identical, e.g. a single processing unit of the flying apparatus 100. Alternatively, controller and control unit can be two separate components of the apparatus 100.

The flying apparatus 100 can further comprise a receiving unit configured to receive a control command for controlling the movement of the at least one part of the radar reflective structure. The receiving unit can be connected to the controller and can be configured to forward the control command to the controller. In this way, the movement of the reflecting structure 105, e.g. a rotation velocity or rotation direction, can be remote-controlled based on a user input, for instance to simulate different velocities.

The radar reflecting structure 105 can be partially movably mounted to the base body 101 via a fixture 107, which can either be a component of the base body 101 or of the radar reflective structure 105 itself. In an embodiment, the radar reflecting structure 105 and the fixtures 107 form a rotor structure, different from the at least one rotor 103*a-b*.

Alternatively to the cylindrical structure 105 shown in FIG. 1, the radar reflective structure can also comprise a spherical structure.

Figure 2B:
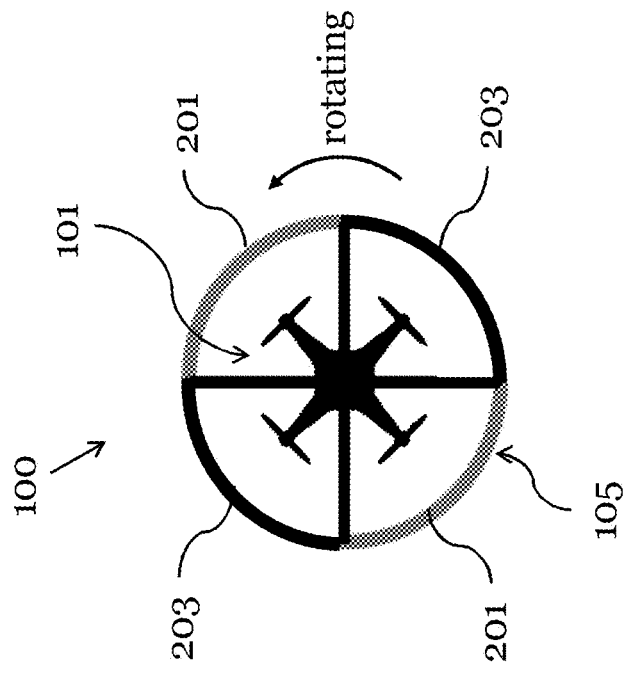
FIG. 2*a-b* shows top views of two different flying apparatuses according to further embodiments.
Figure 2A:
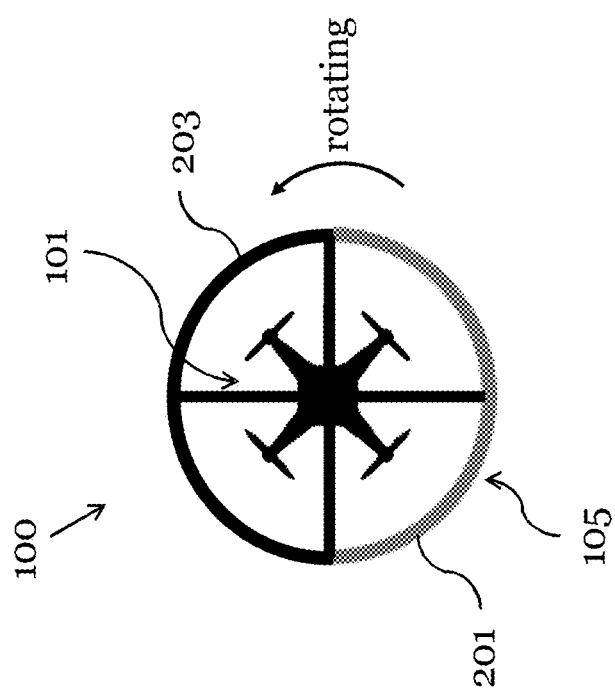

FIG. 2*a-b* shows top views of two different flying apparatuses 100 according to further embodiments.

Both flying apparatuses 100 in FIGS. 2*a* and 2*b* are quadcopters which comprise cylindrical radar reflective structures 105 whose surface can be rotated. Thereby, the radar reflective structures 105 comprise reflective elements 201 and non-reflective elements 203.

Preferably, the reflective and non-reflective elements 201, 203 are arranged on an outer surface of the cylindrical structure 105. For example, the reflective elements 201 can comprise radar reflective materials, such as aluminum, and/or a radar reflective coating. In contrast, the non-reflective elements 203 can comprise a radar absorbing material.

The reflective and non-reflective elements 201, 203 can be arranged on the cylindrical structure 105 according to a certain pattern. In particular, the elements are alternately arranged on the cylindrical structure 105. For example, the cylindrical structure 105 of the apparatus 100 in FIG. 2*a* comprises one reflective and one non-reflective element 201, 203, while the cylindrical structure 105 of the apparatus 100 in FIG. 2*b* comprises two reflective elements 201 and two non-reflective elements 203, which are arranged alternately.

The speed and direction of rotation of the cylinder surface can be varied. By rotating the surface, Doppler signals with certain frequencies can be generated in the reflected radar signals, wherein the generated frequencies depend on the speed and the arrangement of the reflective and non-reflective elements 201, 203. These Doppler signals can be used to calibrate the radar system.

In addition, the surface of the radar reflecting structure 105 can be moved in such a way, that the reflecting and non-reflecting elements 201, 203 face an incoming radar beam alternately one after another. In this way, the reflected radar signal, in particular an signal intensity, can be modulated dependent on a rotation velocity of the surface and an arrangement of the elements 201, 203. This modulation can make it easier to identify the flying apparatus 100 and/or distinguish the apparatus 100 from a static environment.

Figure 3:
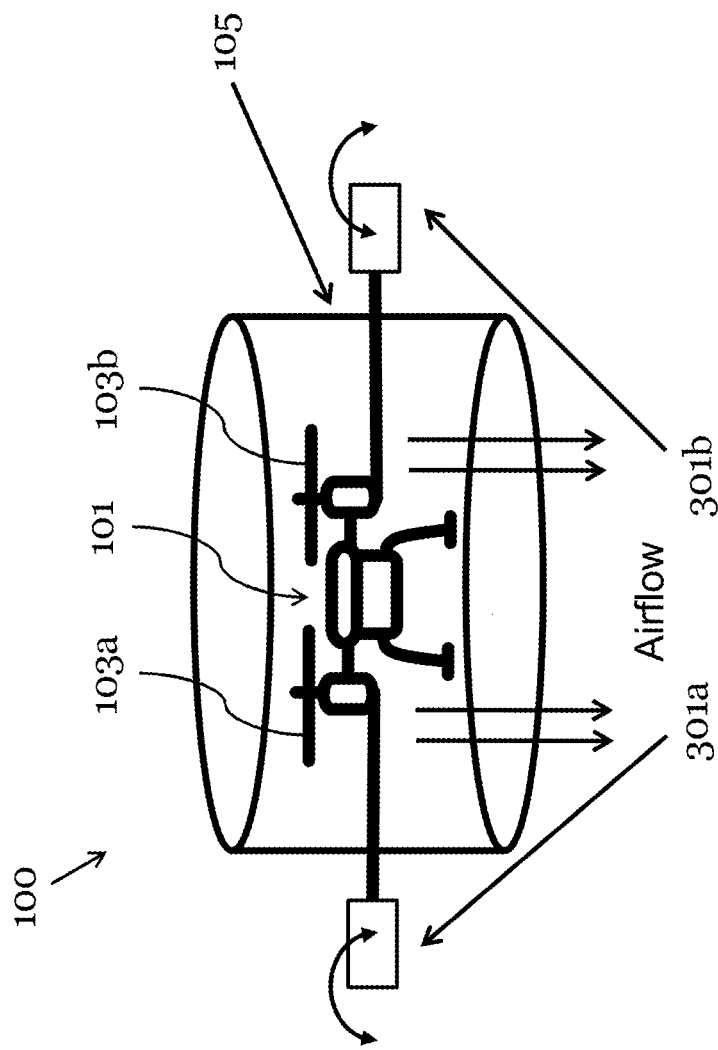
FIG. 3 shows a schematic diagram of a flying apparatus according to an embodiment.

FIG. 3 shows a schematic diagram of the flying apparatus 100 according to a further embodiment.

In addition to the cylindrical structure, the radar reflective structure 105 of the flying apparatus 100 in FIG. 3 comprises two reflective panels 301a, 301b.

The panels 301a, 301b can be mounted to the base body with elongated connecting pieces. In particular, each panel 301a, 301b and the corresponding connecting piece can form a paddle shaped structure.

The panels 301a, 301b can be rotated around the base body 101 and/or around a longitudinal axis of the connecting piece. This rotation can generate a Doppler shift in a reflected radar signal.

For example, the cylindrical structure of the reflective structure 105 can remain static relative to the base body 101 and only the panels 301a, 301b can be configured to rotate relative to the base body 101. The cylindrical structure can comprise openings to allow the rotation of the panels 301a, 301b.

In particular, the panels 301a, 301b can be tilted to reflect an incoming radar signal in different directions. This allows detecting an absolute position of the flying apparatus with the radar system.

Further, FIG. 3 shows a downward facing airflow that is generated by the rotors 103a-b. Since the cylindrical structure is open at the top and the bottom, this airflow is only minimally influenced by the radar reflective structure 105.

Figure 4:
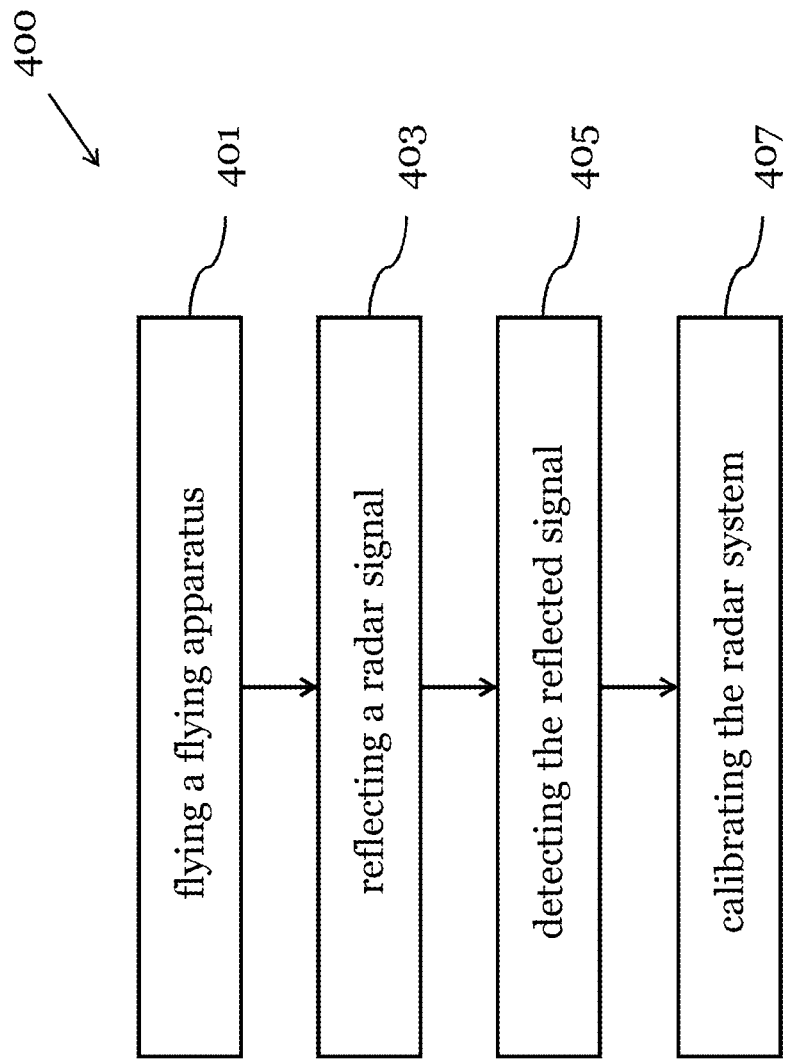
FIG. 4 shows a schematic diagram of a method for calibrating a radar system according to an embodiment.

FIG. 4 shows a schematic diagram of a method 400 for calibrating the radar system according to an embodiment.

The method 400 comprises: flying 401 the flying apparatus 100 through a detection range of the radar system; reflecting 403 the radar signal from the radar reflective structure 105 of the flying apparatus 100, wherein at least one part of the radar reflective structure 105 is movably mounted to a base body 101 of the flying apparatus 100; detecting 405 the reflected signal with the radar system; and calibrating 407 the radar system based on the detected reflected signal while taking into account the movement of the at least one part of the radar reflective structure 105 relative to the base body 101.

In particular, calibrating the radar system can comprise detecting several parameters of the flying apparatus 100, for example a range, an azimuth, a Doppler shift, etc., with the radar system. For calibrating of the radar system, the parameters detected by the system can be compared with known real parameters of the flying apparatus.

All features of all embodiments described, shown and/or claimed herein can be combined with each other.

The invention claimed is:

1. A flying apparatus for calibrating a radar system, comprising:
  a base body, wherein the base body comprises:
  a radar reflective structure, wherein at least one part of the radar reflective structure is movably mounted to the base body, and wherein the at least one part can be moved actively or passively,
  wherein the at least one part of the radar reflective structure is rotatably mounted to the base body,
  wherein a rotation axis of the at least one part of the reflective structure is identical to at least one rotor axis,
  wherein the rotation axis of the at least one part of the reflective structure passes through the center of gravity of the flying apparatus,
  wherein the radar reflective structure comprises reflective and non-reflective elements, and
    wherein the reflective and non-reflective elements are arranged on a surface, and
  wherein by rotating the surface, Doppler signals with certain frequencies are generated in the reflected radar signals, wherein the generated frequencies depend on the speed and the arrangement of the reflective and non-reflective elements.

2. The flying apparatus of claim 1, wherein the base body is at least partially surrounded by the radar reflective structure.

3. The flying apparatus of claim 1, wherein the radar reflective structure comprises reflective and non-reflective elements.

4. The flying apparatus of claim 1, wherein the radar reflective structure comprises a cylindrical structure.

5. The flying apparatus of claim 3, wherein the reflective and non-reflective elements are alternately arranged on a surface of the cylindrical structure.

6. The flying apparatus of claim 1, wherein the radar reflective structure comprises at least one reflective panel, which is mounted to the base body with an elongated connecting piece.

7. The flying apparatus of claim 1, wherein the reflective structure comprises a rotor structure, which is different from the at least one rotor configured to generate lift.

8. The flying apparatus of claim 1, wherein the reflective structure is configured to reflect an incoming radar signal in at least two different directions.

9. The flying apparatus of claim 1, comprising a control, which is configured to control the movement, in particular a rotation, of the at least one part of the radar reflective structure.

10. The flying apparatus of claim 1, comprising a receiving unit configured to receive a control command for controlling the movement of the at least one part of the radar reflective structure.

11. The flying apparatus of claim 1, wherein the flying apparatus is a drone, in particular a quadcopter or other multicopter drone.

12. The flying apparatus of claim 1, comprising at least one rotor adapted to generate lift; a drive configured to drive the rotor; and a control unit configured to control a flying operation of the flying apparatus, wherein a rotation axis of the at least one part of the reflective structure is identical to at least one rotor axis.

13. A method for calibrating a radar system, wherein the method comprises:
  flying a flying apparatus, in particular the flying apparatus of claim 1, through a detection range of the radar system;
  reflecting a radar signal from a radar reflective structure of the flying apparatus, wherein at least one part of the radar reflective structure is movably mounted to a base body of the flying apparatus;
  detecting the reflected signal with the radar system; and
  calibrating the radar system based on the detected reflected signal while taking into account the movement of the at least one part of the radar reflective structure relative to the base body,
  wherein the at least one part of the radar reflective structure is rotatably mounted to the base body, wherein the rotation axis of the at least one part of the reflective structure passes through the center of gravity of the flying apparatus, wherein the radar reflective structure comprises reflective and non-reflective elements, and wherein the reflective and non-reflective elements are arranged on a surface, and wherein by rotating the surface, Doppler signals with certain frequencies are generated in the reflected radar signals, wherein the generated frequencies depend on the speed and the arrangement of the reflective and non-reflective elements.

14. A flying apparatus for calibrating a radar system, comprising:

a base body, wherein the base body comprises:

a radar reflective structure, wherein at least one part of the radar reflective structure is movably mounted to the base body, and wherein the at least one part can be moved actively or passively, wherein the radar reflective structure comprises reflective and non-reflective elements, and wherein the reflective and non-reflective elements are arranged on a surface, and wherein by rotating the surface, Doppler signals with certain frequencies are generated in the reflected radar signals, wherein the generated frequencies depend on the speed and the arrangement of the reflective and non-reflective elements.

* * * * *